(12) United States Patent
Chong et al.

(10) Patent No.: US 11,625,878 B2
(45) Date of Patent: Apr. 11, 2023

(54) METHOD, APPARATUS, AND SYSTEM GENERATING 3D AVATAR FROM 2D IMAGE

(71) Applicant: Seerslab, Inc., Seoul (KR)

(72) Inventors: Jin Wook Chong, Seongnam-si (KR); Jae Cheol Kim, Seoul (KR); Hyo Min Kim, Seoul (KR); Jun Hwan Jang, Yongin-si (KR)

(73) Assignee: Seerslab, Inc., Seoul (KR)

( * ) Notice: Subject to any disclaimer, the term of this patent is extended or adjusted under 35 U.S.C. 154(b) by 23 days.

(21) Appl. No.: 16/914,715

(22) Filed: Jun. 29, 2020

(65) Prior Publication Data

US 2021/0005003 A1    Jan. 7, 2021

(30) Foreign Application Priority Data

Jul. 1, 2019 (KR) .......................... 10-2019-0078712

(51) Int. Cl.
*G06T 13/40* (2011.01)
*G06T 17/20* (2006.01)
*G06T 7/40* (2017.01)
*G06V 40/16* (2022.01)

(52) U.S. Cl.
CPC ................ *G06T 13/40* (2013.01); *G06T 7/40* (2013.01); *G06T 17/205* (2013.01); *G06V 40/171* (2022.01); *G06V 40/174* (2022.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,796,480 B2* | 10/2020 | Chen | G06T 15/04 |
| 2010/0259538 A1* | 10/2010 | Park | G06T 13/40 |
| | | | 345/473 |
| 2013/0201187 A1 | 8/2013 | Tong et al. | |
| 2013/0271451 A1 | 10/2013 | Tong et al. | |
| 2016/0275721 A1* | 9/2016 | Park | G06V 40/165 |
| 2016/0379041 A1* | 12/2016 | Rhee | G06K 9/627 |
| | | | 382/118 |

(Continued)

FOREIGN PATENT DOCUMENTS

| | | |
|---|---|---|
| KR | 10-2014-0043939 A | 4/2014 |
| KR | 10-2014-0043945 A | 4/2014 |
| KR | 10-2018-0125870 A | 11/2018 |

*Primary Examiner* — Hilina K Demeter
(74) *Attorney, Agent, or Firm* — INVENSTONE Patent, LLC

(57) ABSTRACT

Provided is a method of generating a three-dimensional (3D) avatar from a two-dimensional (2D) image. The method may include obtaining a 2D image by capturing a face of a person, detecting a landmark of the face in the obtained 2D image, generating a first mesh model by modeling a 3D geometrical structure of the face based on the detected landmark, extracting face texture information from the obtained 2D image, determining a second mesh model to be blended with the first mesh model in response to a user input, wherein the first mesh model and the second mesh model have the same mesh topology, generating a 3D avatar by blending the first mesh model and the second mesh model, and applying, to the 3D avatar, a visual expression corresponding to the extracted face texture information.

18 Claims, 15 Drawing Sheets

(56) References Cited

U.S. PATENT DOCUMENTS

| | | | |
|---|---|---|---|
| 2017/0018088 A1* | 1/2017 | Jeong | G06T 17/10 |
| 2017/0039752 A1* | 2/2017 | Quinn | G06T 17/20 |
| 2017/0069124 A1* | 3/2017 | Tong | G06T 17/20 |
| 2017/0154461 A1* | 6/2017 | Rhee | G06V 10/7557 |
| 2017/0206694 A1* | 7/2017 | Jiao | G06V 40/174 |
| 2018/0046854 A1* | 2/2018 | Kittler | G06V 40/172 |
| 2018/0158230 A1* | 6/2018 | Yan | G06V 10/7557 |
| 2018/0182165 A1* | 6/2018 | Zatepyakin | G06T 17/205 |
| 2018/0253593 A1* | 9/2018 | Hu | G06V 40/165 |
| 2018/0336714 A1 | 11/2018 | Stoyles et al. | |
| 2019/0244410 A1* | 8/2019 | Viklund | G06T 15/04 |

\* cited by examiner

FIG. 6A

| Major Classification | Characteristic Name |
|---|---|
| Mustache and/or beard | no mustache and/or beard |
| | mustache |
| | beard 1 |
| | beard 2 |
| Hair shape | bald hair |
| | straight hair |
| | curly hair |
| | forelock |
| | whisker |
| | M-shaped forehead |
| Hair color | black hair |
| | brown hair |
| | blond hair |
| | gray hair |
| Eyebrows | arch-shaped eyebrows |
| | thick hair eyebrows |

FIG. 6B

| Major Classification | Characteristic Name |
|---|---|
| Face characteristic | bags under eyes |
| | large lips |
| | large nose |
| | cheekbone |
| | small eyes |
| | egg-shaped face |
| | fat |
| | arrow nose |
| | double chin |
| Accessory | glasses |
| | earring |
| | hat |
| | necklace |
| | necktie |
| Skin | face flush |
| | white face |
| | makeup |
| | lipstick |
| Sex | Male/female |

Thick hair eyebrows

Arch-shaped eyebrows

Straight hair

Curly hair

Forelock

Bald hair

Whisker

M-shaped forehead

Large nose
Large nose
Thick hair eyebrows
Glasses
Mustache
Male
Open mouth
Open mouth
Whisker
Smile
Curly hair
Young Arch-shaped eyebrows
Attractive
Bags under eyes
Large nose
Black hair
Thick hair eyebrows
Male
No mustache and beard
Straight hair
Young

METHOD, APPARATUS, AND SYSTEM GENERATING 3D AVATAR FROM 2D IMAGE

CROSS-REFERENCE TO RELATED APPLICATIONS

This application claims the benefit of priority of Korean Patent Application No. 10-2019-0078712 filed on Jul. 1, 2019, all of which are incorporated by reference in their entirety herein.

BACKGROUND OF THE INVENTION

Field of the Invention

The present disclosure relates to a method of generating an animation image and, more particularly, to a method of generating a computer-based animation image based on a camera image.

Related Art

As smartphones are recently supplied, camera applications having entertainment elements for fun-loving through camera photographing are diversified. In particular, in some of the smartphones, an application for generating avatar by animating a face included in a photographed subject for photographing is variously developed.

A conventional avatar generation application operates in such a way to select an image and to generate avatar most similar to the selected image. However, conventional avatar generation applications have a difficulty in generating avatar itself because they generate avatar based on only a single sheet of an image, and thus has a problem in that they produce avatars dissimilar to characters in images or avatars that do not properly include the features of faces and mostly have similar shapes. This cause to halve a fun. Furthermore, there is a problem in that a motion of a generated avatar is unnatural because the avatar does not operate in conjunction with a landmark that captures the characteristics of a face within the face.

SUMMARY OF THE INVENTION

The present disclosure provides a method of generating a three dimensional (3D) avatar from a two-dimensional (2D) image, which can generate a 3D avatar that is similar to a target and that exhibits a beauty or the personality of a character by blending a first mesh model having a mesh by extracting the mesh topology of a face from an image including the face and a second mesh model having the same mesh topology as the first mesh model and a highlighted beauty or animation character.

In an aspect, a method of generating a three-dimensional (3D) avatar from a two-dimensional (2D) image may include obtaining a 2D image by capturing a face of a person, detecting a landmark of the face in the obtained 2D image, generating a first mesh model by modeling a 3D geometrical structure of the face based on the detected landmark, extracting face texture information from the obtained 2D image, determining a second mesh model to be blended with the first mesh model in response to a user input, wherein the first mesh model and the second mesh model have the same mesh topology, generating a 3D avatar by blending the first mesh model and the second mesh model, and applying, to the 3D avatar, a visual expression corresponding to the extracted face texture information.

The first mesh model may be generated based on a result of analysis generated by analyzing a location relation of the detected landmark with respect to multiple basic face mesh models previously stored in a database.

The method may further include applying, to the first mesh model, a blend shape for adjusting the size of a specific portion within the face in response to a user input.

The method may further include detecting, in a moving image, a modification of a specific portion within the face when the 2D image is the moving image including continuous images, and applying a corresponding modification to the first mesh model or the 3D avatar based on a predetermined rule of the blend shape.

The predetermined rule of the blend shape may be defined with respect to the mean face mesh model of the multiple basic face mesh models previously stored in the database.

The predetermined rule of the blend shape may be defined as a number corresponding to a specific movement or state.

The second mesh model may have a mesh topology identical with the mean mesh topology of the multiple basic face mesh models previously stored in the database, and may be at least one of a model having highlighted beauty or an animation character model.

The second mesh model may indicate a plurality of second mesh model candidates and may be determined based on one of the plurality of indicated second mesh model candidates selected in response to a user input.

The database may include a database associated with principal component analysis (PCA).

The blending may be performed by assigning a first weight to the first mesh model and assigning a second weight to the second mesh model.

At least one of the first weight and the second weight may be determined in response to a user input.

The method may further include detecting, in the 2D image, face attribute information indicative of a detailed feature of the face using a deep learning model, and applying, to the 3D avatar, the visual expression corresponding to the detected face attribute information.

The face attribute information may include an attribute related to at least one of hair, glasses, mustache and/or beard, eyebrows, eyes, a mouth, a nose, skin, an expression, and a jaw of the face.

In another aspect, an apparatus for generating a three-dimensional (3D) avatar from a two-dimensional (2D) image may include a memory storing an instruction related to an operation of a processor, and the processor configured to obtain a 2D image by capturing a face of a person, detect a landmark of the face in the obtained 2D image, generate a first mesh model by modeling a 3D geometrical structure of the face based on the detected landmark, extract face texture information from the obtained 2D image, determine a second mesh model to be blended with the first mesh model in response to a user input, the first mesh model and the second mesh model having the same mesh topology, generate a 3D avatar by blending the first mesh model and the second mesh model, and apply, to the 3D avatar, a visual expression corresponding to the extracted face texture information.

In still another aspect, a system for generating a three-dimensional (3D) avatar from a two-dimensional (2D) image may include a user terminal configured to select a 2D image obtained by capturing a face of a person and to request, from a server, the generation of a 3D avatar based on the face within the selected 2D image, and the server configured to obtain the 2D image from the user terminal, detect a landmark of the face in the obtained 2D image, generate a first mesh model by modeling a 3D geometrical structure of the face based on the detected landmark, extract face texture information from the obtained 2D image, determine a second mesh model to be blended with the first mesh model in response to a selection signal from the user terminal, the first mesh model and the second mesh model having the same mesh topology, generate the 3D avatar by blending the first mesh model and the second mesh model, and apply, to the 3D avatar, a visual expression corresponding to the extracted face texture information.

In still another aspect, a method of generating a three-dimensional (3D) avatar from a two-dimensional (2D) image may include obtaining a 2D image by capturing a face of a person, detecting a landmark of the face in the obtained 2D image, generating a first mesh model by modeling a 3D geometrical structure of the face based on the detected landmark, modifying at least one face element in the first mesh model, determining a second mesh model to be blended with the modified first mesh model in response to a user input, The modified first mesh model and the second mesh model have the same mesh topology, and generating a 3D avatar by blending the modified first mesh model and the second mesh model.

In still another aspect, an apparatus for generating a three-dimensional (3D) avatar from a two-dimensional (2D) image may include a memory storing an instruction related to an operation of a processor, and the processor configured to obtain a 2D image by capturing a face of a person, detect a landmark of the face in the obtained 2D image, generate a first mesh model by modeling a 3D geometrical structure of the face based on the detected landmark, modify at least one face element in the first mesh model, determine a second mesh model to be blended with the modified first mesh model in response to a user input, The modified first mesh model and the second mesh model have the same mesh topology, and generate a 3D avatar by blending the modified first mesh model and the selected second mesh model.

In still another aspect, a system for generating a three-dimensional (3D) avatar from a two-dimensional (2D) image may include a user terminal configured to select a 2D image obtained by capturing a face of a person and to request, from a server, the generation of a 3D avatar based on the face within the selected 2D image, and the server configured to obtain the 2D image from the user terminal, detect a landmark of the face in the obtained 2D image, generate a first mesh model by modeling a 3D geometrical structure of the face based on the detected landmark, modify at least one face element in the first mesh model, determine a second mesh model to be blended with the modified first mesh model in response to a selection signal from the user terminal, The modified first mesh model and the second mesh model have the same mesh topology, and generate the 3D avatar by blending the modified first mesh model and the selected second mesh model.

BRIEF DESCRIPTION OF THE DRAWINGS

FIGS. 6a and 6b are diagrams illustrating details of face attribute information.

DESCRIPTION OF EXEMPLARY EMBODIMENTS

Figure 1:
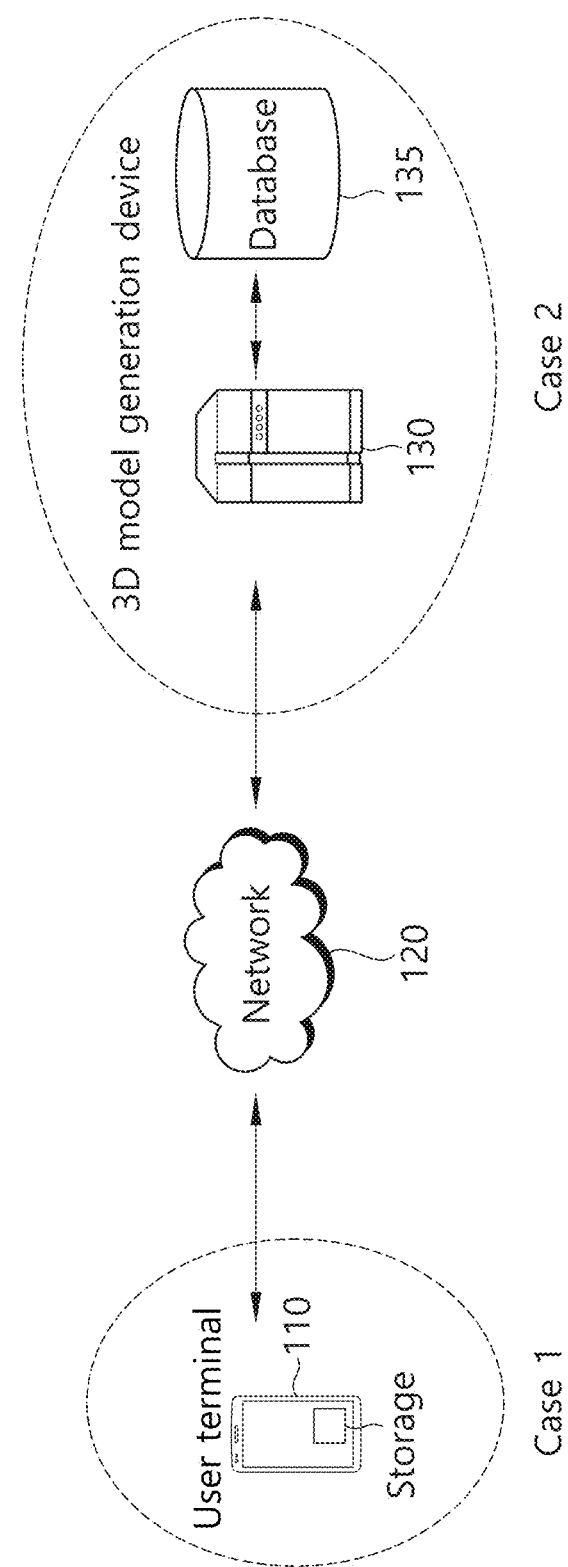
FIG. 1 is a block diagram schematically illustrating a system to which a method of generating a 3D avatar according to an embodiment of the present disclosure is applied.

The present disclosure may be changed in various ways and may have various embodiments, and specific embodiments are illustrated in the drawings and described in detail.

It is however to be understood that the present disclosure is not intended to be limited to the specific disclosure and that the present disclosure includes all changes, equivalents and substitutions which fall within the spirit and technological scope of the present disclosure.

Terms, such as the first and the second, may be used to describe various elements, but the elements should not be restricted by the terms. The terms are used to only distinguish one element from the other element. For example, a first element may be named a second element without departing from the scope of rights of the present disclosure. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present disclosure. An expression of the singular number should be construed as including an expression of the plural number unless clearly defined otherwise in the context. It is to be understood that in this application, a term, such as "include (or comprise)" or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

All terms used herein, including technical terms or scientific terms unless defined otherwise in the specification, have the same meanings as those commonly understood by a person having ordinary skill in the art to which the present disclosure pertains. Terms, such as those commonly used and defined in dictionaries, should be construed as having the same meanings as those in the context of a related technology, and should not be construed as having ideal or excessively formal meanings unless explicitly defined otherwise in the specification.

Hereinafter, preferred embodiments of the present disclosure are described in more detail with reference to the accompanying drawings. In describing the present disclosure, in order to help general understanding, the same reference numerals are used to denote the same elements throughout the drawings, and a redundant description of the same elements is omitted.

FIG. 1 is a block diagram schematically illustrating a system to which a method of generating a three-dimensional (3D) avatar according to an embodiment of the present disclosure is applied. As illustrated in FIG. 1, the system for generating a 3D avatar according to an embodiment of the present disclosure may include a user terminal 110, a network 120, a 3D model generation device 130 and a database 135.

Referring to FIG. 1, an algorithm related to the generation of a 3D avatar according to an embodiment of the present disclosure may be executed in the user terminal 110 and/or the 3D model generation device 130. An avatar indicates a 3D animation model that resembles a specific person within a two-dimensional (2D) image.

The user terminal 110 may include a camera. Alternatively, the user terminal 110 may have stored a 2D image including a face. The user terminal 110 may generate a 3D avatar from a 2D image captured by the camera or a 2D image obtained from another apparatus. In relation to the generation of the 3D avatar, in a first embodiment, the 3D avatar is directly generated in the user terminal 110. In contrast, in a second embodiment, the user terminal 110 selects a specific 2D image and requests the generation of a 3D avatar. In response to the request, the 3D model generation device 130 and the database 135 generate the 3D avatar and return the generated 3D avatar to the user terminal 110. In this case, the 3D model generation device 130 may be a server class terminal (may also be called a "server"), and may process requests from multiple user terminals 110 connected over the network 120.

According to the first embodiment, the user terminal 110 may include at least a display, and a computing device having the communication ability with the network 120 for accessing a social messaging system, another user terminal, and the server 130. The user terminal 110 may be called an "apparatus." The user terminal 110 includes a remote device, a workstation, a computer, a general-purpose computer, an Internet appliance, a handheld device, a wireless device, a portable device, a wearable computer, a cellular or mobile phone, a personal digital assistant (PDA), a smartphone, a tablet, an ultrabook, a netbook, a laptop, a desktop, a multi-processor system, microprocessor-based or programmable home appliances, a game console, a set-top box, a network PC, and a mini-computer, but the present disclosure is not limited thereto. A user may be a human being, a machine or other means interacting with the user terminal 110. In some embodiments, a user interacts with a social messaging system through the user terminal 110. A user may not be a part of a networked environment, but may be associated with the user terminal 110.

The user terminal 110 may include a processor and a storage (or may also be called a "memory"). The storage stores information on various basic face models in order to generate a mesh related to a face included in an input 2D image. The processor of the user terminal generates a first mesh model related to the face included in the input 2D image using a mesh topology obtained from basic face models stored in the storage. Furthermore, the processor generates a 3D avatar by blending the first mesh model and the second mesh model of the same mesh topology having a highlighted beauty and character. In this case, the processor may generate the final 3D avatar by additionally applying face texture information and face attribute information obtained from the 2D image.

In the second embodiment, a 2D input image is selected through the user terminal 110. Thereafter, when an "avatar generation icon" is pressed, a request for the generation of a 3D avatar is transmitted to the server 130 over the network 120. In response thereto, the server 130 extracts a face from the input 2D image and extracts a landmark from the extracted face. Thereafter, the server 130 generates a first mesh model using the landmark. Furthermore, in order to select a second mesh model, multiple second mesh model candidates are provided to the user terminal 110. The user terminal 110 displays the second mesh model candidates on display means, and receives a user input for a selected second mesh model. When one of the second mesh model candidates is selected, the server 130 generates a 3D avatar by blending the selected second mesh model and the first mesh model. Thereafter, the server 130 generates the final 3D avatar by modifying the 3D avatar using texture information and face attribute information obtained from the face of the 2D input image, and provides the final 3D avatar to the user terminal 110. In this case, the database 135 performs a function similar to the storage in the first embodiment. That is, the database 135 may have stored multiple basic face models, and may have stored mean face model information generated based on the multiple basic face models and/or information related to a mesh topology.

According to an embodiment of the present disclosure, the database and/or the storage may include a database and/or storage associated with principal component analysis (PCA). The PCA is a scheme for dimensionally reducing multi-dimensional data (i.e., data having several variables), and is a method of converting as more information as possible into values of a visible form when the dimension is reduced.

Although the following description is given based on the first embodiment, it is evident to those skilled in the art to which the present disclosure pertains that such technical characteristics may also be applied to a second embodiment.

Figure 2:
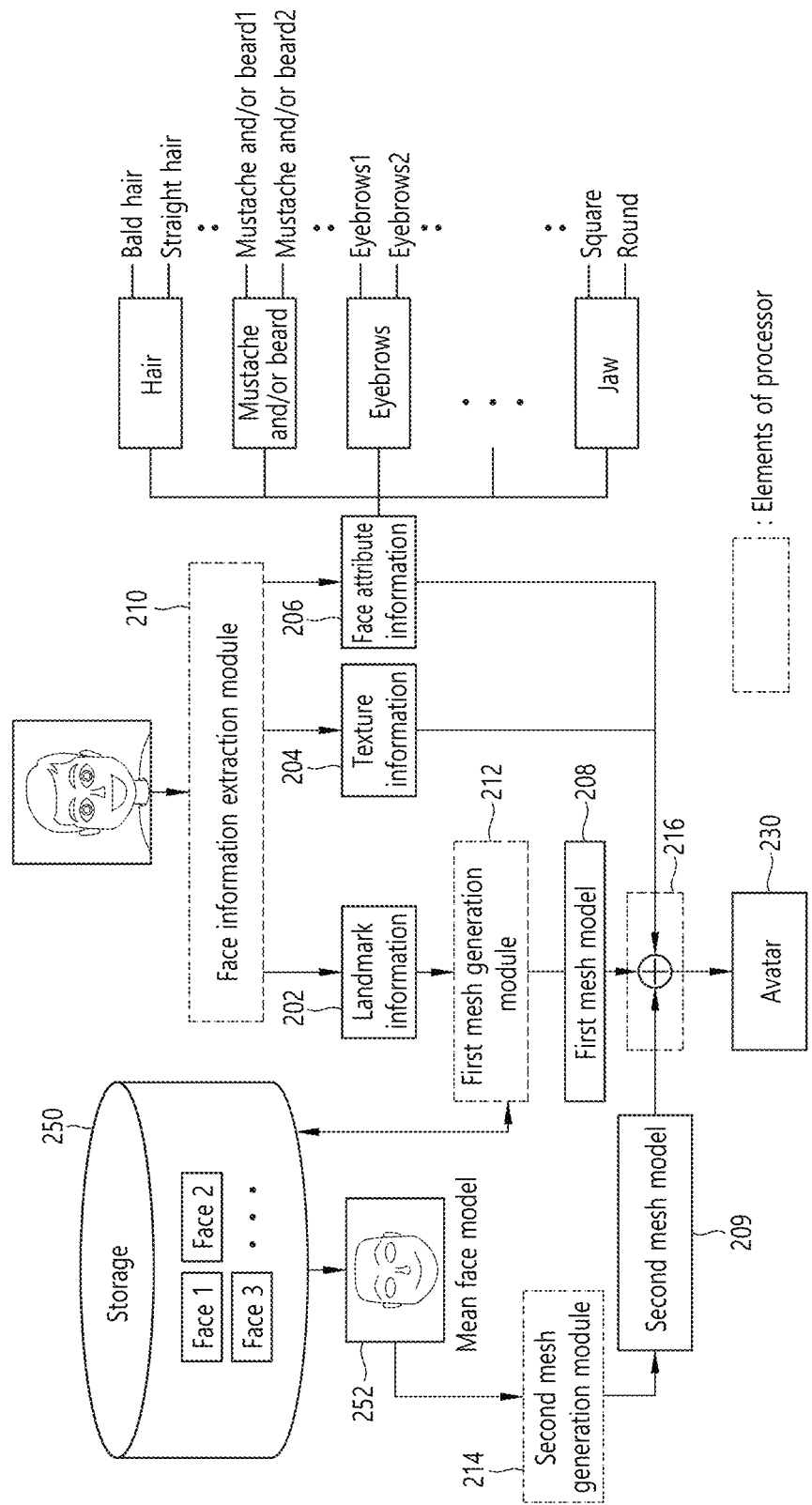
FIG. 2 is a block diagram for describing a method of generating a 3D avatar according to an embodiment of the present disclosure.

FIG. 2 is a block diagram for describing a method of generating a 3D avatar according to an embodiment of the present disclosure. As illustrated in FIG. 2, an apparatus for executing a method of generating a 3D avatar according to an embodiment of the present disclosure may include a processor, including a face information extraction module 210, a first mesh generation module 212, a second mesh generation module 214 and a blending module 216, and a storage 250.

Referring to FIG. 2, the face information extraction module 210 obtains landmark information 202, texture information 204 and face attribute information 206 from an input 2D image. A landmark is defined by an extraction algorithm previously stored as multiple points that characterize a face.

The first mesh generation module 212 generates a first mesh model 208 by applying a mesh topology indicative of a 3D geometrical characteristic of the face using the extracted landmark. The mesh topology defines an array of geometrical structures between essential elements constituting the face. For example, the mesh topology is a geometrical structure of the face defined using multiple polygons generated by dividing at least one edge of landmark-based polygon at a specific ratio, in addition to polygons directly generated through a landmark, such as a polygon 1 that connects a left eye corner landmark, a right eye corner landmark and the landmark of the top portion of a nose and a polygon 2 that connects a landmark at the top point of the nose, a side-of-nose point landmark, and a nose left/right corner point landmark. The geometrical structure is determined based on a result of the analysis of multiple basic face models previously stored in the storage 250. If the mesh topology is the same, after all or most of input face images are generated into a mesh model, another mesh model having the characteristics of an input face image may be generated by applying the generated mesh models to the another mesh model having the same mesh topology.

The face information extraction module 210 obtains the texture information 204 indicative of the skin texture of the face. The texture information 204 may be obtained as one piece of texture information 204 that affects the entire face or may be obtained as multiple pieces of different texture information 204 for each portion of the face.

Furthermore, the face information extraction module 210 obtains the face attribute information 206. The face attribute information 206 is information indicative of attributes, such as hair, mustache and/or beard, eyebrows, a shape of a jaw, color, etc., and includes information on various attributes that have been previously defined. The face attribute information 206 is more specifically described with reference to FIGS. 6a to 11b. A blending module 216 applies the extracted texture information 204 and face attribute information 206 to at least one of the first mesh model 208, the second mesh model 209 or an avatar blended using the first mesh model 208 or the second mesh model 209.

After the first mesh model 208 is generated, the second mesh generation module 214 may obtain a mean face model 252 from multiple basic face models stored in the storage, and may generate multiple second mesh model candidates based on the mean face model 252. Thereafter, the generated second mesh model candidates are shown to a user through the display means. The user determines a second mesh model to be blended with the first mesh model by selecting one of the second mesh model candidates.

The second mesh model candidates may have the same number of meshes and same topology as the first mesh model. According to an embodiment of the present disclosure, the second mesh model candidate may be a model having a highlighted beauty and character. For example, the second mesh model candidate has the same mesh topology as the mean face model, but may include a model whose large eyes have been highlighted, a model whose high nose has been highlighted, a model whose circular mouth has been highlighted, a model whose slim face shape has been highlighted, or a model obtained by blending at least two of the models. Furthermore, a mesh model generated based on the face of a pretty actor or actress, a singer, or other entertainers may also become a candidate of the second mesh model. Furthermore, animation characters may also become candidates of the second mesh model. For example, a mesh model obtained by applying the mean mesh topology to animation characters, such as Elsa in Frozen, a mermaid princess, Snow White, or Jasmine, may become a candidate of the second mesh model. One of such candidates is selected by the user, and a second mesh model 209 actually used for blending is determined based on the selected candidate.

The blending module 206 blends the first mesh model 208 and the second mesh model 209. In this case, a previously stored ratio is determined as a blending ratio. A blending ratio of 1:1 may have been set as a default value, but a ratio, such as 2:1, 3:1, 4:1, 5:1, 1:2, 1:3, 1:4, or 1:5, may also be applied through a change of user setting. Furthermore, the blending module 206 generates the final 3D avatar 230 by applying texture information, obtained based on the texture information 204, to the first mesh model 208, the second mesh model 209 and/or an avatar, obtained by blending the first mesh model 208 and the second mesh model 209, generally or for each portion. Furthermore, the blending module 206 generates the final 3D avatar 230 by applying the face attribute information 206 to the first mesh model 208, the second mesh model 209 and/or an avatar obtained by blending the first mesh model 208 and the second mesh model 209.

Figure 3:
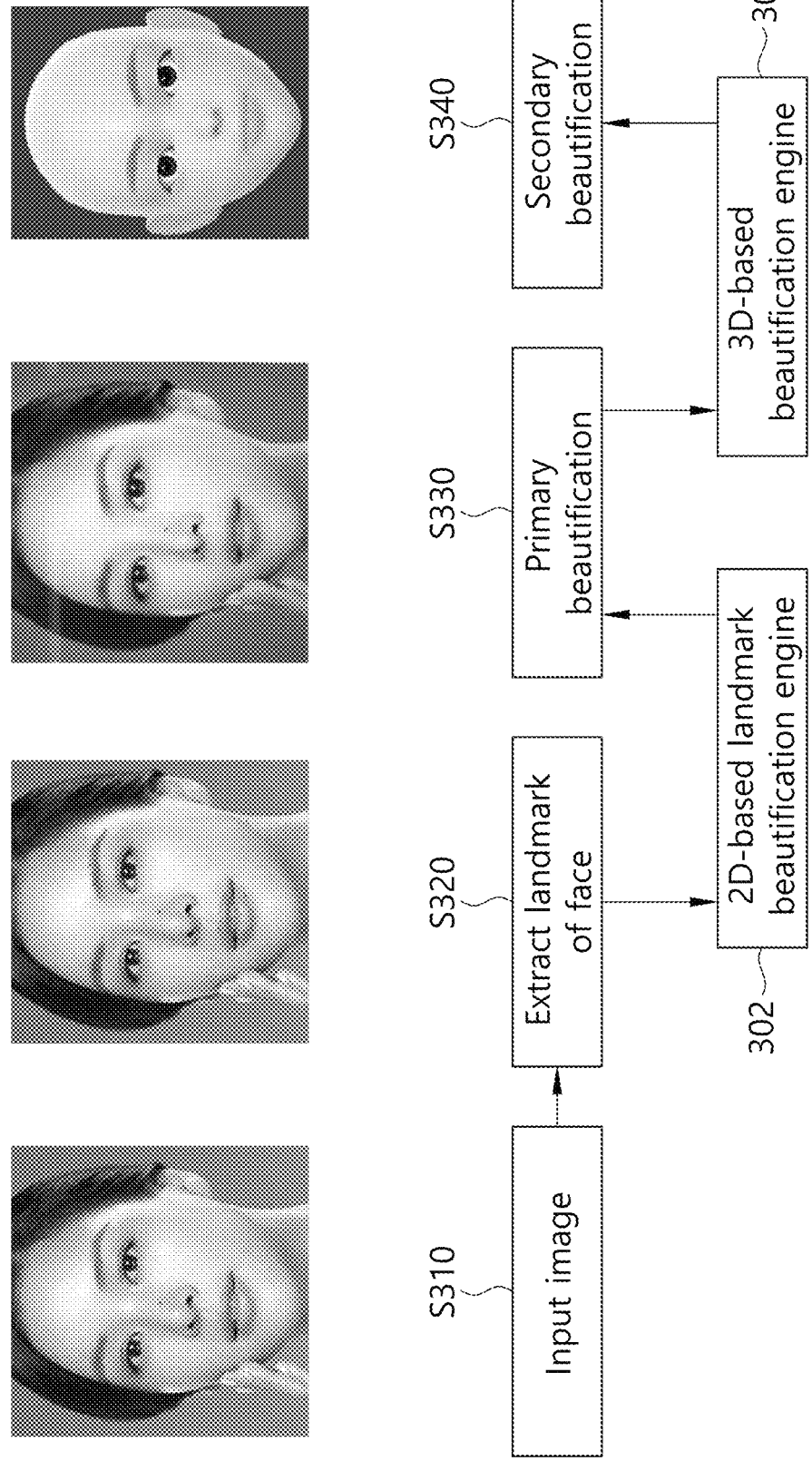
FIG. 3 is a concept view for describing operations of two beautification engines.

FIG. 3 is a concept view for describing operations of two beautification engines.

Referring to FIG. 3, when receiving a 2D image including a face (S310), the apparatus extracts the landmark of a face from the input 2D image (S320). In this case, a 2D-based landmark beautification engine 302 may perform 2D-based beautification based on the extracted landmark. For example, the 2D-based landmark beautification engine 302 may perform beautification through a 2D image modification, such as a method of increasing the size of an eye, a method of adjusting the location of an eye, or a method of changing a face outline, using a landmark related to an eye among the extracted landmarks. This may be defined as a primary beautification step S330.

Thereafter, a 3D-based beautification engine 304 generates a first mesh model by applying a mesh to the face to which the primary beautification has been applied. That is, in the embodiment of FIG. 2, one 2D-based beautification may be performed before the first mesh model is input. Thereafter, as described above, a 3D avatar is finally generated by blending the first mesh model, generated based on the face to which the primary beautification has been applied, and a second mesh model having a highlighted beauty and character. This may be defined as a secondary beautification step S340. That is, the apparatus may perform primary beautification using a 2D image modification, and may perform secondary beautification using a 3D mesh topology.

Figure 4:
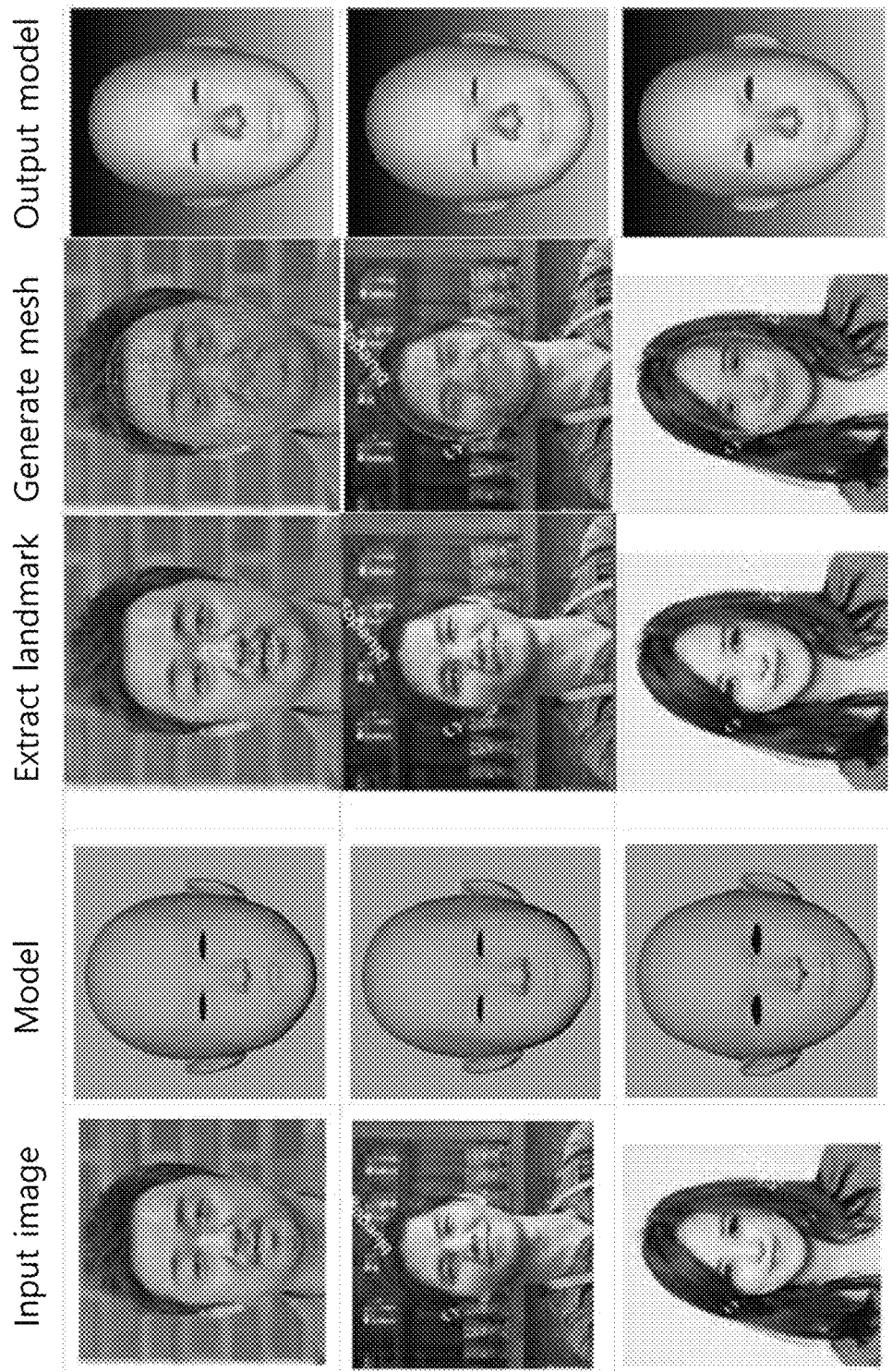
FIG. 4 is a concept view for describing the extraction of a landmark and a corresponding process of generating a mesh.

FIG. 4 is a concept view for describing the extraction of a landmark and a corresponding process of generating a mesh.

Referring to FIG. 4, the apparatus extracts a landmark from a face within an image. In this case, the extracted landmark includes at least one of eyebrows, eyes, a nose, a mouth, ears, and points indicative of the contour of the face. The apparatus outputs a first mesh model by applying, to the landmark, a mesh topology generated based on a result of the analysis of a face model stored in the storage. The mesh topology is generated as follows. First, multiple points (e.g., points forming a face outline and/or points forming the outline of face elements, such as and/or eye, nose, mouth) that characterize the face are defined as vertexes. The defined vertexes are merged to form straight lines. The structure and array of polygons obtained by merging the straight lines are defined as a mesh topology. The extracted landmark information may be represented as coordinates. A mesh model to which the landmark has been applied is generated by matching the coordinates of the landmark with the defined vertexes of the mesh topology. In this case, the apparatus may determine whether the face of an input image is a male or a female, and may apply a mesh topology corresponding to the determined sex.

Figure 5:
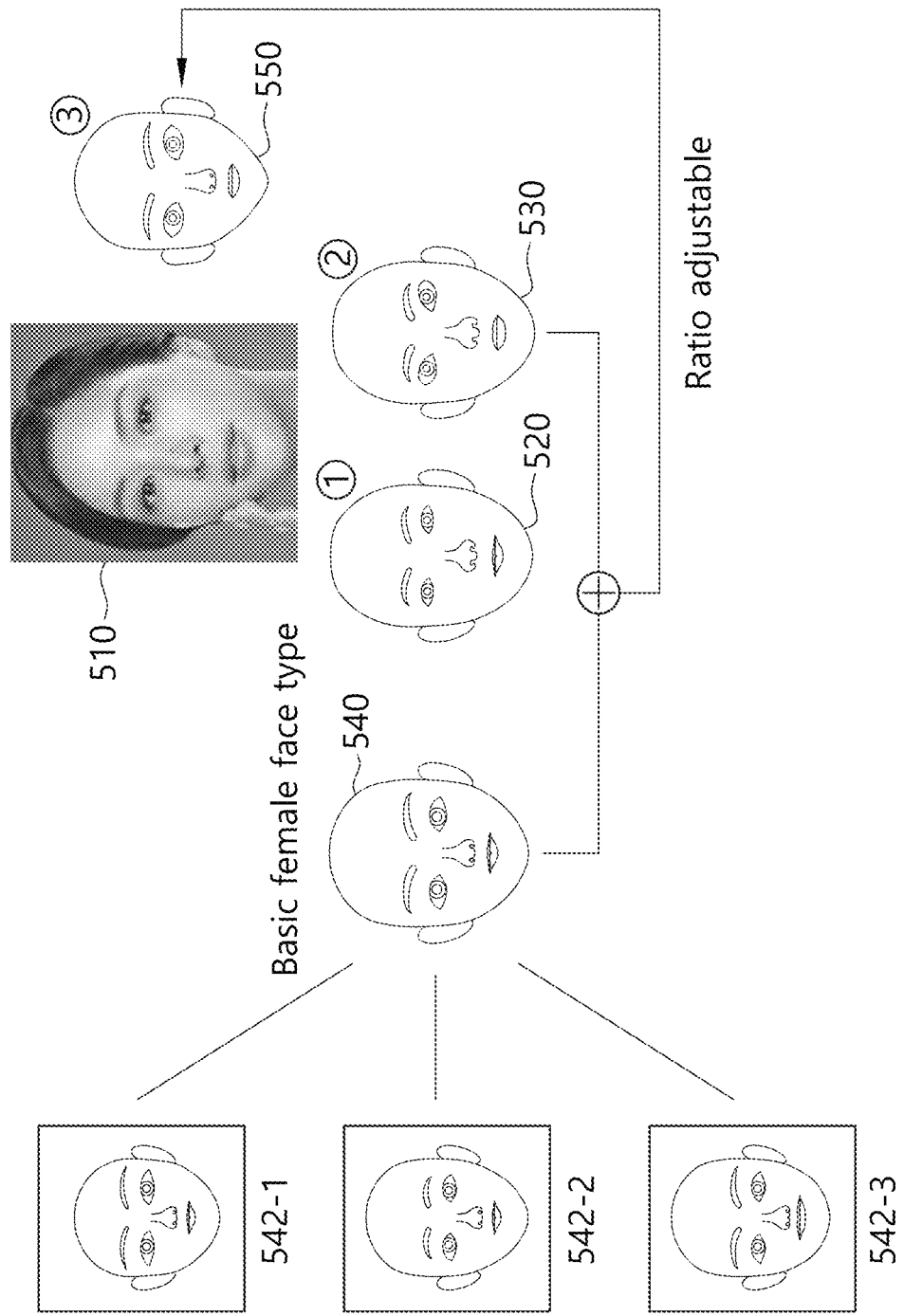
FIG. 5 is a concept view for describing a method of blending a first mesh model and a second mesh model.

FIG. 5 is a concept view for describing a method of blending a first mesh model and a second mesh model.

Referring to FIG. 5, as in the process of generating an output model in FIG. 4, the apparatus outputs a first mesh model 520 using the landmark of a face 510 within an input image. Thereafter, the apparatus may generate a modified first mesh model 530 by applying primary beautification for increasing the eyes of the first mesh model 520 and modifying lip shapes of the first mesh model 520. Such a modification may be performed by applying a modification of a mesh to a basic mesh topology using a blend shape scheme. The blend shape scheme is more specifically described with reference to FIG. 13.

The apparatus shows, to a user, second mesh model candidates 542-1, 542-2, and 542-3 to be blended with the modified first mesh model 530 through the display means. In this case, each of the second mesh model candidates 542-1, 542-2, and 542-3 may have the mesh topology of the mean face model or may have a mesh topology corresponding to the sex of the input image. Furthermore, as described above, mesh models having a highlighted beauty and character may be preferable. The user selects one (e.g., 542-2) of the second mesh model candidates 542-1, 542-2, and 542-3. The selected candidate model is a second mesh model 540. In the embodiment of FIG. 5, it is assumed that the basic model of a female face has been selected as the second mesh model 540.

The apparatus blends the modified first mesh model 530 and the second mesh model 540. The blending can be performed because the two mesh models have the same mesh topology. The blending may be performed in each corresponding mesh unit in each of the two mesh models. In this case, a blending ratio follows preset ratio information. Basically, 1:1 is preferable, but a blending ratio may be determined based on user preference because the results of an avatar are different depending on a ratio of a beauty and a character. For example, in order to highlight a beauty and a character, the second mesh model 540 may be blended at a much higher ratio than the first mesh model 530. In contrast, if an output matter similar to his or her figure is to be obtained, the blending ratio of the first mesh model 530 may be increased. That is, a ratio of 2:1, 3:1, 4:1, 5:1, 1:2, 1:3, 1:4, or 1:5 may be applied depending on user setting. The final 3D avatar 550 may be obtained as the results of the blending.

FIGS. 6a and 6b are diagrams illustrating details of face attribute information.

Referring to FIGS. 6a and 6b, the apparatus has label information of various face attributes. The apparatus may have about 40 attributes and apply the 40 attributes to a model output by defining the characteristics of a face. Face attribute information indicative of such detailed characteristics of faces may be inferred through a deep learning algorithm (model) related to image analysis.

Attribute labels inferred through the deep learning algorithm are basically divided into a mustache and/or beard shape, an eyebrow shape, a hair shape, a hair color, a face shape, an accessory, a skin expression, an expression, and others. The apparatus expresses the results of each attribute as an attribute value of "Yes/No." For example, the attribute value of a "mustache" shape may be determined as "No", the attribute value of an "arch-shaped eyebrows" may be determined as "No", . . . , the attribute value of an "M-shaped forehead" may be determined as "Yes." Attribute value information determined as described above may be referred when the texture of an output model and a visual expression of a corresponding face portion is generated. The attribute values of such divided attribute classifications are described with reference to FIGS. 7 to 10. However, there may be face attributes not defined as such attribute labels.

Figure 7:
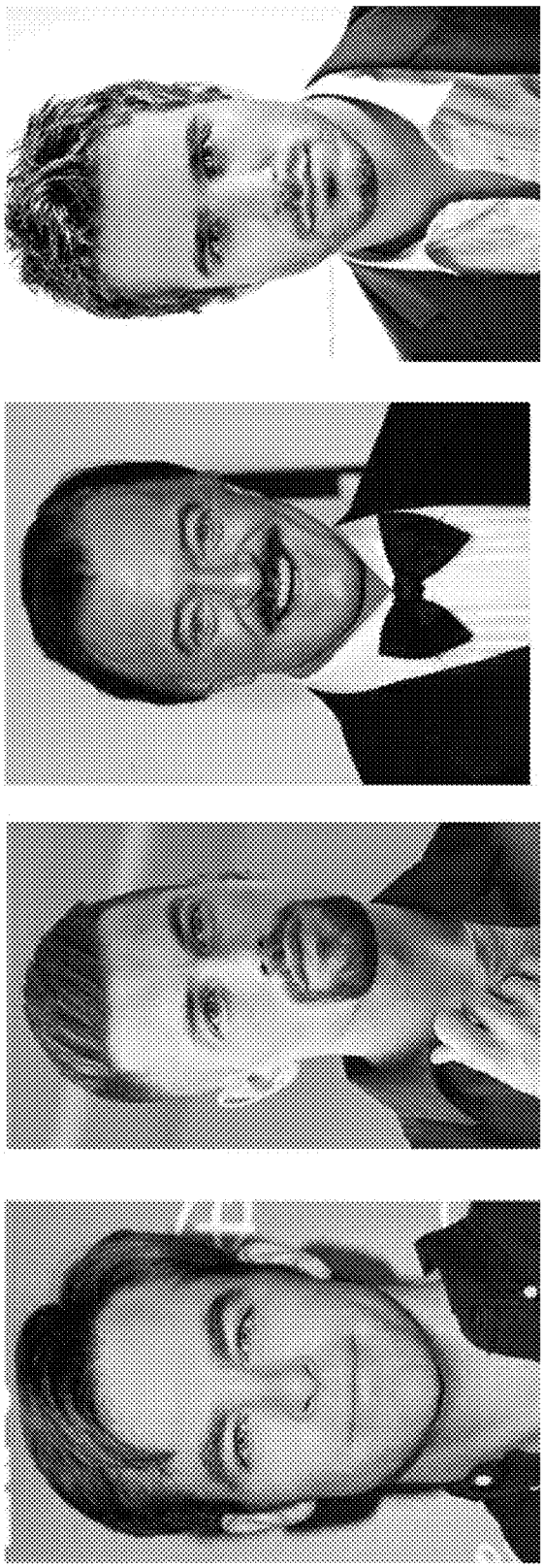
FIG. 7 is a diagram for describing mustache and beard shape attributes of face attribute information.

FIG. 7 is a diagram for describing mustache and beard shape attributes of face attribute information.

Referring to FIG. 7, the apparatus may divide various mustache and beard shapes into four attribute labels. For example, the apparatus may define shapes, related to mustache and beard shapes, as a "no mustache and/or beard" attribute, a "mustache" attribute indicative of a mustache shape that is connected between a nose and a mouth and connected to a portion of a jaw, a "beard 1" attribute indicative of a beard shape formed between a nose and a mouth only, and a "beard 2" attribute in which a bear is generally formed between a nose and a mouth and at the lower end of lips and a jaw area.

Figure 8:
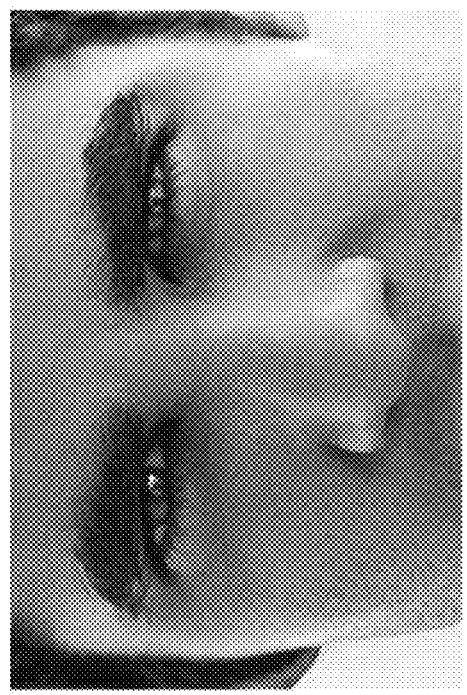
FIG. 8 is a diagram for describing eyebrow shape attributes of face attribute information.
Figure 8:
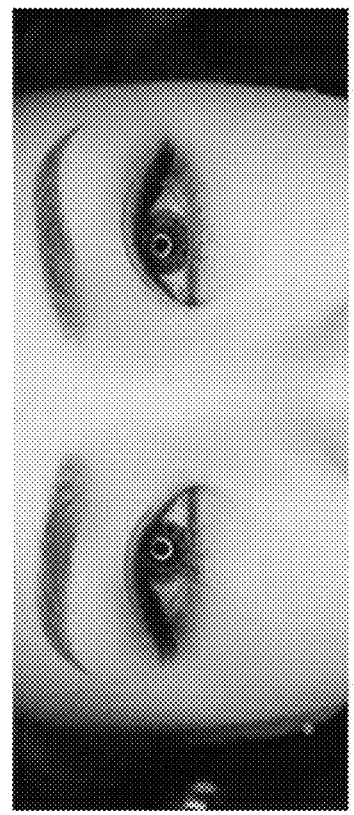

FIG. 8 is a diagram for describing eyebrow shape attributes of face attribute information.

Referring to FIG. 8, the apparatus defines shapes of eyebrows as two attribute labels. The apparatus defines the shapes of eyebrows as an "arch-shaped eyebrow" attribute indicative of arch-shaped eyebrows and a "thick hair eyebrow" attribute indicative of thick hair eyebrows.

Figure 9:
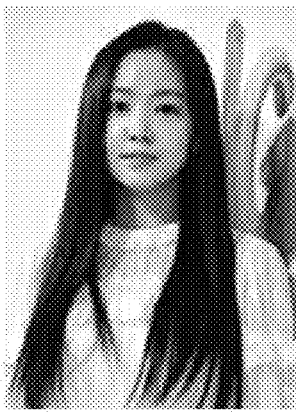
FIG. 9 is a diagram for describing hair shape attributes of face attribute information.
Figure 9:
Figure 9:
Figure 9:
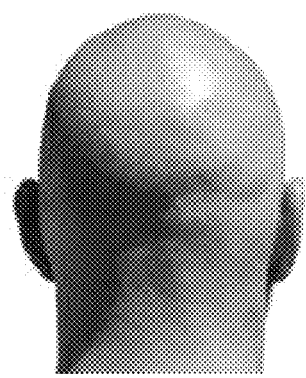
Figure 9:
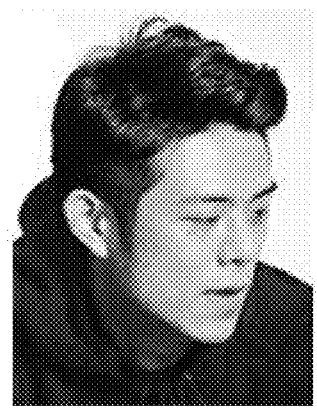
Figure 9:

FIG. 9 is a diagram for describing hair shape attributes of face attribute information.

Referring to FIG. 9, the apparatus may define various hair shapes as six attribute labels. For example, the apparatus may define attributes, related to hair shapes, as a "bald hair" attribute indicative of a bald hair shape, a "straight hair" attribute indicative of straight hair, a "curly hair" attribute indicative of wave hair, a "forelock" attribute indicative of a shape including forelock, a "whisker" attribute indicative of a shape including hair at a whisker portion, and an "M-shaped forehead" attribute indicative of a hair loss hair line.

The apparatus may define four attribute labels by analyzing the color of hair. For example, the apparatus may define hair color using a "black hair" attribute indicative of black hair, a "brown hair" attribute indicative of brown hair, a "blond hair" attribute indicative of blond hair, and a "gray hair" attribute indicative of gray hair.

Figure 10:
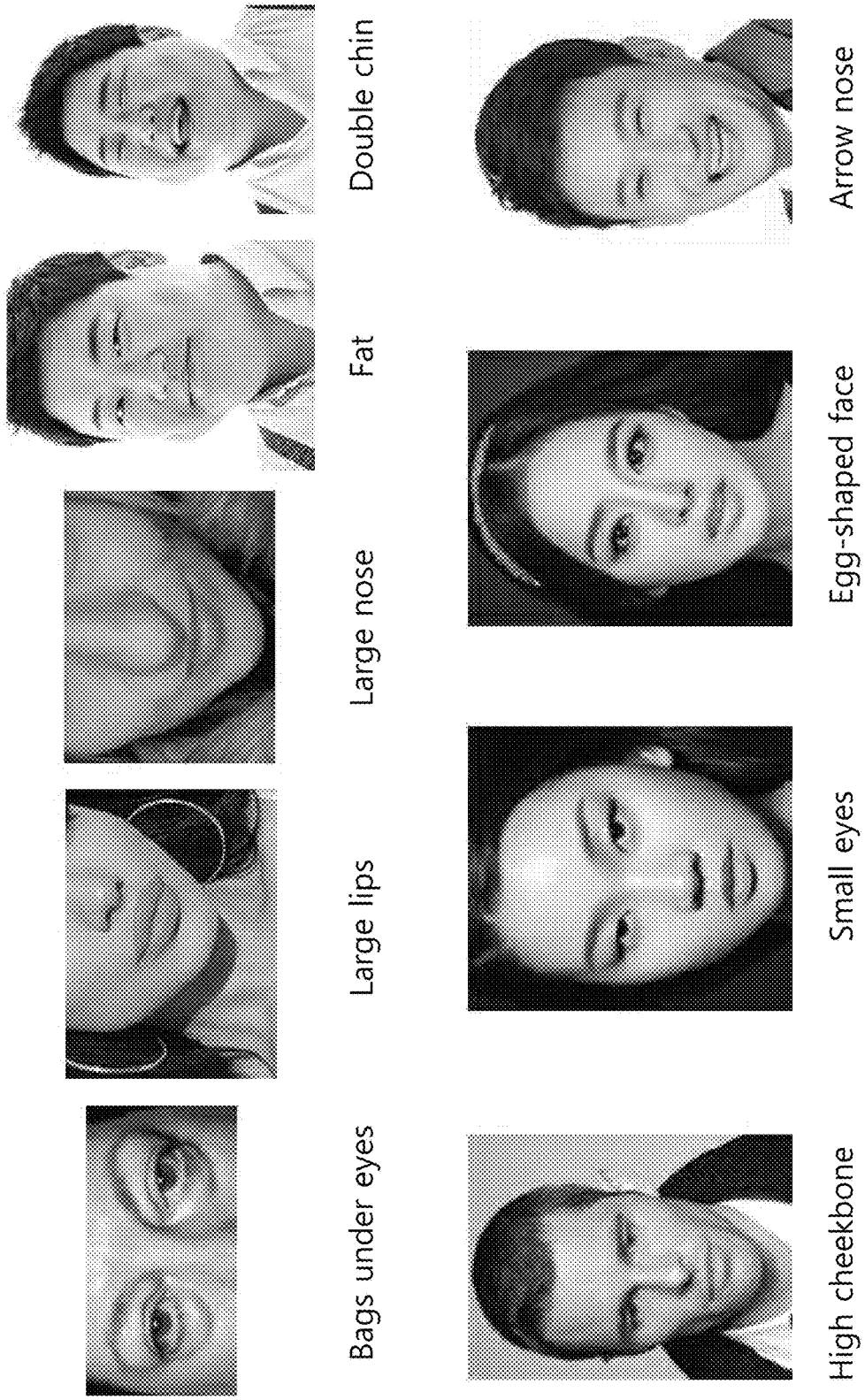
FIG. 10 is a diagram for describing face shape attributes of face attribute information.

FIG. 10 is a diagram for describing face shape attributes of face attribute information.

Referring to FIG. 10, the apparatus may define nine attribute labels by analyzing face shapes. The apparatus may define face shapes as a "bags under eyes" attribute indicative of bags under eyes, a "large lip" attribute indicative of a large lip shape, a "large nose" attribute indicative of a large nose, a "fat" attribute indicative of fatness, a "double chin" attribute indicative of a double chin shape, a "cheekbone" attribute indicative of a high cheekbone shape, a "small eye" attribute indicative of small eyes, an "egg-shaped face" attribute indicative of an egg-shaped face, and an "arrow nose" attribute indicative of a sharp nose shape.

In addition, the apparatus may define five attributes by analyzing a wearing accessory along with a face. For example, the apparatus may define the wearing state of an accessory as a "glasses" attribute indicative of a glasses-worn state, an "earring" attribute indicative of earring wearing, a "hat" attribute indicative of a hat-worn state, a "necklace" attribute indicative of necklace wearing, and a "necktie" attribute indicative of necktie wearing. In particular, if necklace and necktie attribute values are Yes, the apparatus supports that an animation model including a corresponding accessory in a body portion other than a face can be generated.

The apparatus defines four attribute labels by analyzing an image related to a skin expression. The apparatus may define an image related to a skin expression as a "face flush" attribute indicative of a shape indicating that a face is flush, a "white face" attribute indicative of a pale skin, a "makeup" attribute indicative of an excessive makeup state, and a "lipstick" attribute indicating the state in which lipstick has been heavily put on.

Furthermore, the apparatus may define two attributes by analyzing an image related to face expression. The apparatus may define face expressions as an "open mouth" attribute indicative of a slightly open mouth state and a "smile" attribute indicative of a smiling state.

Additionally, the apparatus supports that the state of a face within an input image can be expressed in detail by further defining other four attributes. Such other attributes include an "attractive" attribute indicating that a degree of attraction of a face is a criterion or more, a "blurry" attribute indicative of a feeling of a blurry photo, a "male" attribute indicating that a face is a male face, and a "young" attribute indicating that a face is the face of a person younger than a reference value.

Figure 11A:
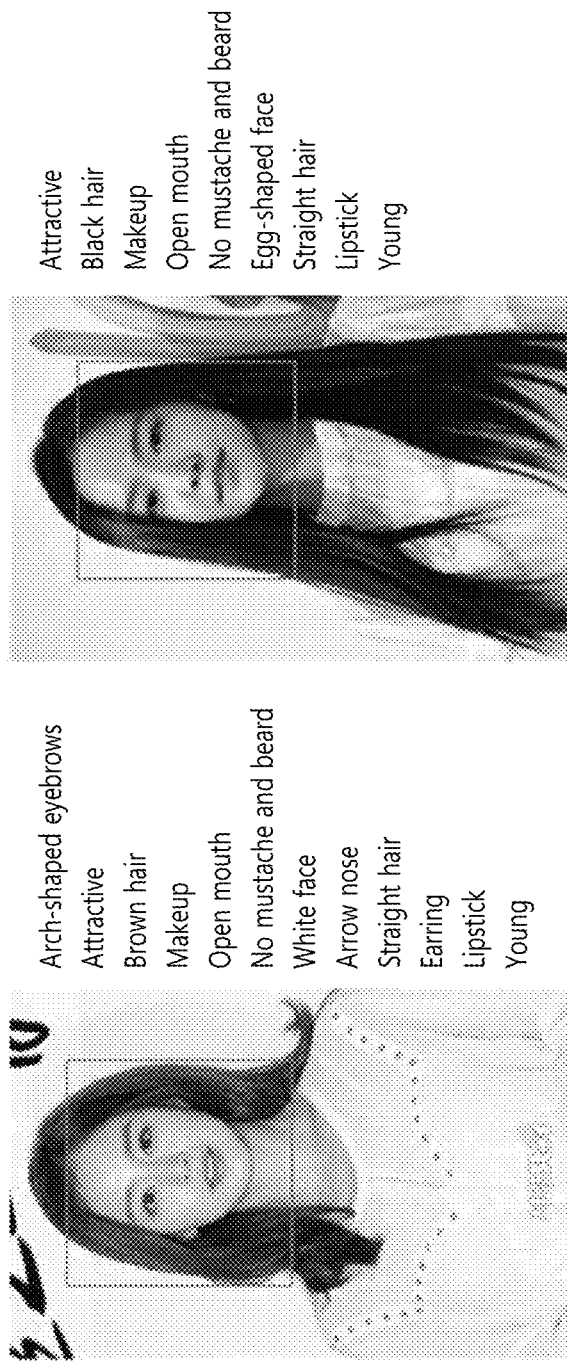
FIGS. 11a and 11b are diagrams illustrating the results of the prediction of face attribute information in sample images.
Figure 11B:
Figure 11B:
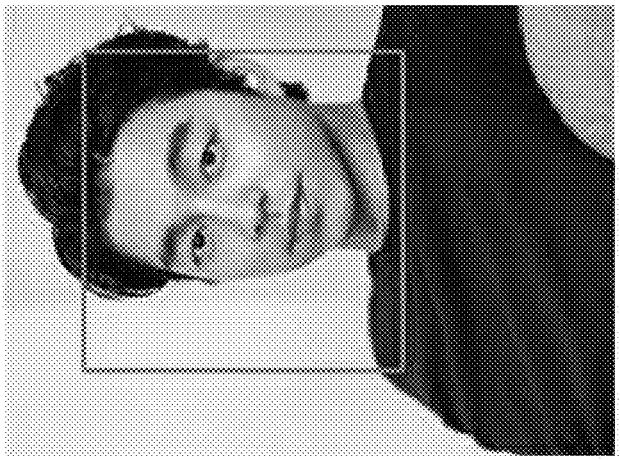

FIGS. 11a and 11b are diagrams illustrating the results of the prediction of face attribute information in sample images.

In a left model of FIG. 11a, the apparatus may define most of face attribute values as "No", and may define the "arch-shaped eyebrows", "attractive", "brown hair", "makeup", "open mouth", "no mustache and beard", "white face", "arrow nose", "straight hair", "earring", "lipstick" and "young" attributes as "Yes." Furthermore, in a right model of FIG. 11a, the apparatus may define the "attractive", "black hair", "makeup", "open mouth", "no mustache and beard", "egg-shaped face", "straight hair", "lipstick" and "young" attributes as "Yes", and may define other attributes as "No."

In a left mode of FIG. 11b, the apparatus may define most of face attribute values as "No", and may define the "arch-shaped eyebrows", "attractive", "bags under eyes", "large nose", "black hair", "thick hair eyebrows", "male", "no mustache and beard", "straight hair", and "young" attributes as "Yes." Furthermore, in a right model of FIG. 11b, the apparatus may define the "large nose", "black hair", "thick hair eyebrows", "glasses", "mustache", "male", "open mouth", "beard 1", "whisker", "smile", "curly hair" and "young" attributes as "Yes", and may define other attributes as "No."

Figure 12:
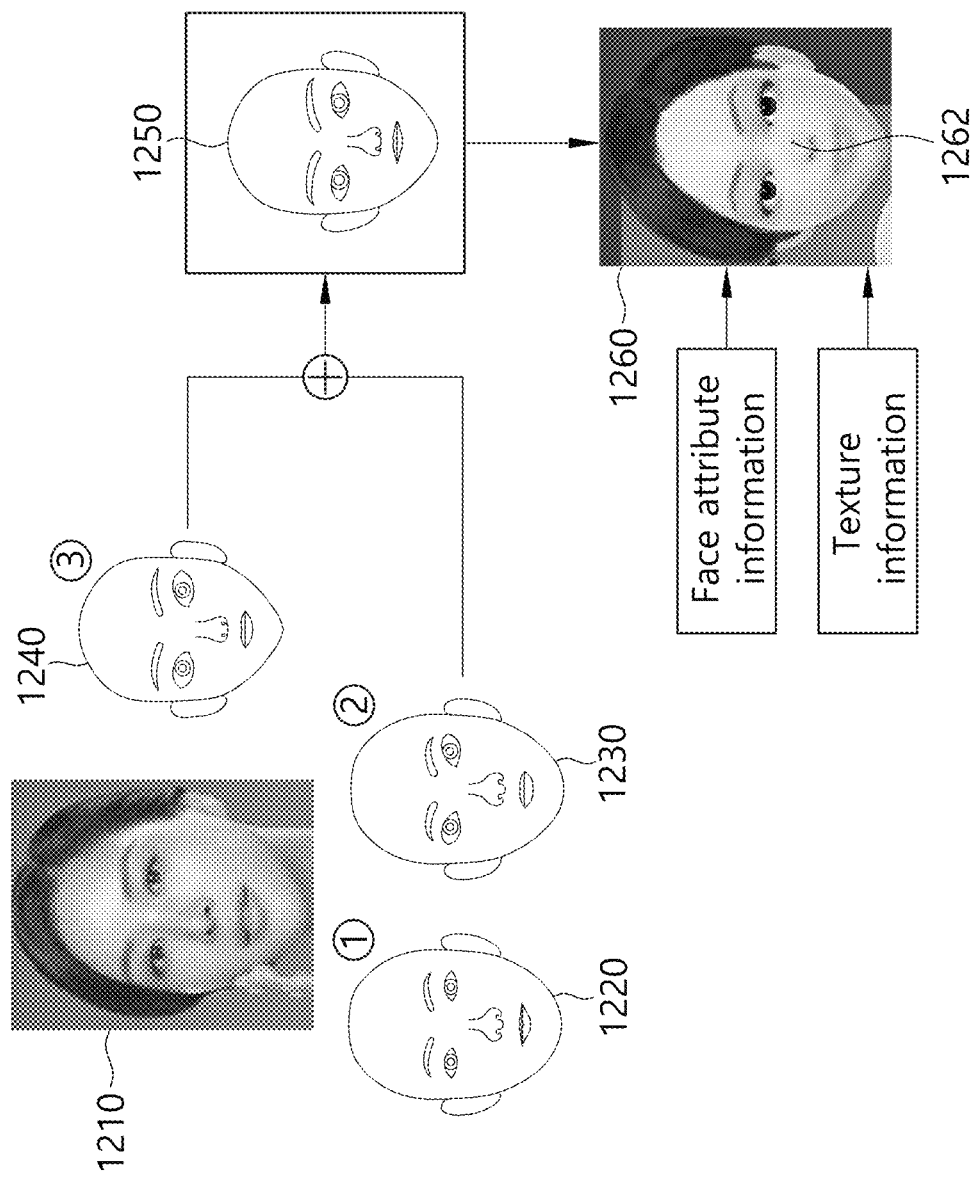
FIG. 12 is a concept view illustrating a process of generating the final 3D avatar by adding face attribute information and texture information to the blending of a first mesh model and a second mesh model.

FIG. 12 is a concept view illustrating a process of generating the final 3D avatar by adding face attribute information and texture information to the blending of a first mesh model and a second mesh model.

Referring to FIG. 12, the apparatus extracts the landmarks of a face 1210 within a 2D input image and generates a first mesh model 1220 based on the landmarks. Furthermore, the apparatus generates a modified first mesh model 1230 obtained by modifying a specific portion of the face through primary beautification. Thereafter, the apparatus generates the final 3D avatar 1250 by blending a second mesh model 1240, selected as one of second mesh model candidates, and the first mesh model 1230.

The 3D avatar 1250 is a neutral face model from which descriptions, such as hair, mustache and/or beard, and a skin tone, that is, accessory elements of the face, are omitted. Accordingly, the apparatus puts texture, generated based on texture information, on the generated 3D avatar 1250, and adds attributes corresponding to face attribute information. In this case, the apparatus may secure different texture information for each face region and apply the different texture information to the 3D avatar 1250 for each region. Furthermore, the apparatus may extract a characteristic point (e.g., a point greater than a preset size) of the face that has not been defined in the face attribute information of FIGS. 7 to 10, like a point 1262 over a nose, and may display the characteristic point at a corresponding location of the 3D avatar 1250. The apparatus generates the final 3D avatar 1260 by applying an attribute value, corresponding to the face attribute information, to the 3D avatar 1250 and applying texture corresponding to texture information.

Figure 13:
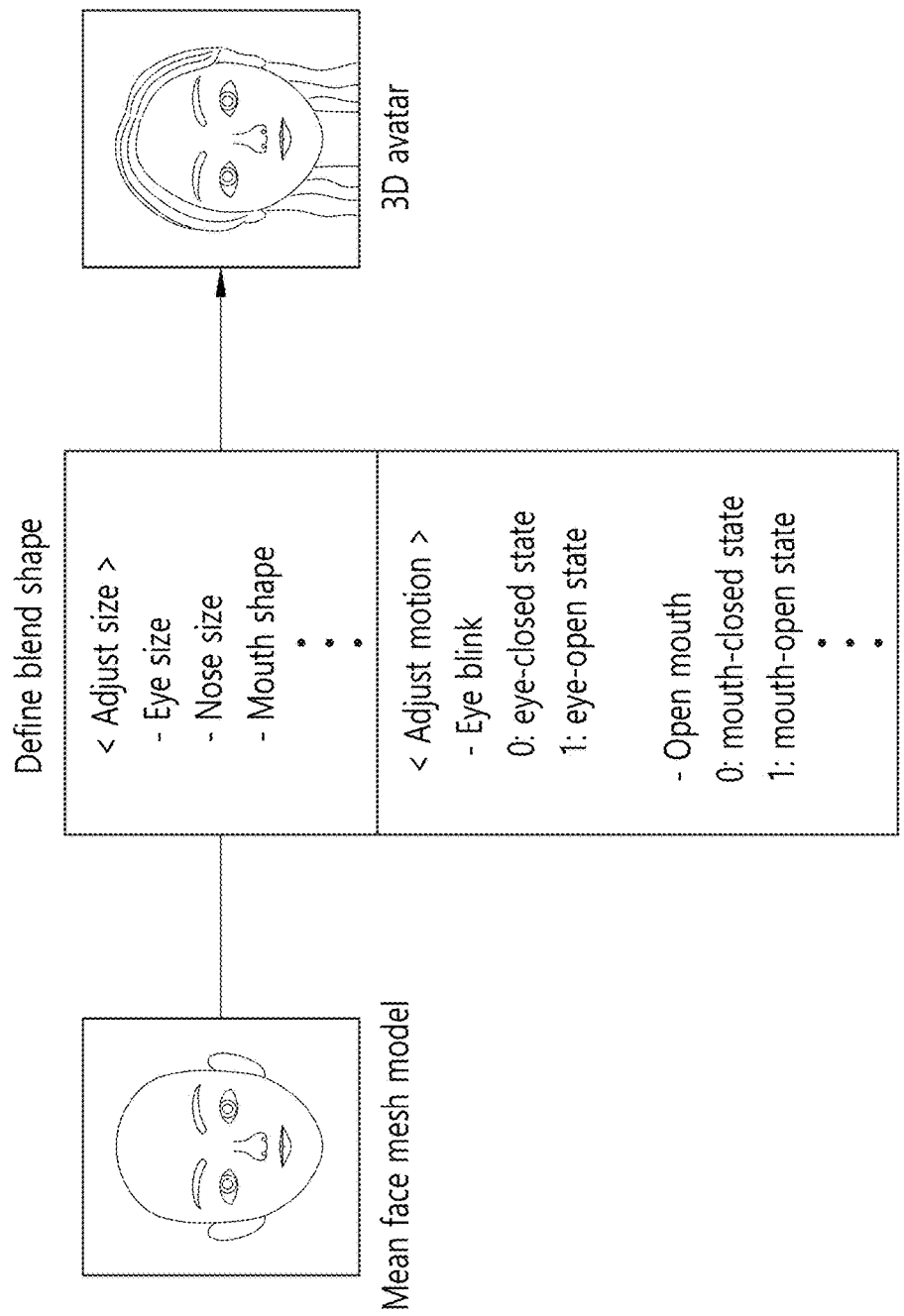
FIG. 13 is a concept view for describing a method of applying a motion of a face to a 3D avatar based on blend shape information.

FIG. 13 is a concept view for describing a method of applying a motion of a face to a 3D avatar based on blend shape information.

Referring to FIG. 13, a blend shape is defined as a target of the mean face mesh model defined as the mean value of basic face models previously stored in the storage. The blend shape is defined in relation to a modification of at least one of the size, location and shape of an element within a face, such as an eye size, a nose size and a mouth shape. Furthermore, the blend shape is defined in relation to a motion. The motion is also defined with respect to the mean face mesh model, and may be defined as a number, such as 0 or 1. For example, in a motion related to an eye blink, "0" may indicate an eye-closed state, and "1" may indicate an eye-open state. Furthermore, in a motion related to mouth opening, "0" may indicate a mouth-closed state, and "1" may indicate a mouth-open state.

As described above, a blend shape defined in relation to a size and motion adjustment with respect to the mean face mesh model is also naturally applied to a 3D avatar.

Furthermore, according to an embodiment of the present disclosure, when a 2D image is a moving image including continuous images, a modification of a specific portion within a face can be detected in the moving image, and a blend shape can be applied. For example, when an eye blink is detected, a modification corresponding to the detected eye blink may be applied to a first mesh model or a 3D avatar based on a predetermined rule of a blend shape. That is, a predetermined blend shape rule may be applied to the mean face mesh model in detecting a change in the shape of a face and applying the detected change to an output model through grafting with face tracking.

According to the method of generating a 3D avatar from a 2D image according to the present disclosure, a user can generate and show an avatar that very resembles himself or herself, that has a highlighted beauty and character characteristics, and that is fun.

Accordingly, there is an effect in that content combined with an application can be promoted by maximizing an entertainment element of a user and enhancing use frequency of the application.

The present disclosure has been described above with reference to the accompanying drawings and embodiments, but it does not mean that the range of protection of the present disclosure is limited to the drawings or embodiments. Those skilled in the art may understand that the present disclosure may be modified and changed in various ways without departing from the spirit and scope of the present disclosure written in the claims.

What is claimed is:

1. A method of generating a three-dimensional (3D) avatar from a two-dimensional (2D) image, the method comprising:
   obtaining a 2D image related to a face of a person;
   detecting a landmark of the face in the obtained 2D image;
   generating a first mesh model by modeling a 3D geometrical structure of the face based on the detected landmark;
   extracting face texture information from the obtained 2D image or modifying at least one face element in the first mesh model;
   determining a second mesh model to be blended with the first mesh model in response to a user input, wherein the first mesh model and the second mesh model have an identical mesh topology or wherein the modified first mesh model and the second mesh model have an identical mesh topology;
   generating a 3D avatar by blending the first mesh model and the second mesh model or by blending the modified first mesh model and the second mesh model; and
   applying, to the 3D avatar, a visual expression corresponding to the extracted face texture information,
   wherein the second mesh model indicates a plurality of second mesh model candidates and is determined based on one of the plurality of indicated second mesh model candidates selected in response to the user input,
   wherein the first mesh model is generated based on a result of analysis generated by analyzing a location relation of the detected landmark with respect to multiple basic face mesh models previously stored in a database,
   wherein the first mesh model is applied to a blend shape for adjusting a size of a specific portion within the face in response to inputs from the user, and
   wherein the blending is performed at a particular blending ratio of x:y that is based upon a user preference, wherein 'x' represents a blending amount of the first mesh model and 'y' represents a blending amount of the second mesh model, whereby x>y results in characteristics of the first mesh model to be more dominant in the face of the avatar or virtual character, and x<y results in characteristics of the second mesh model to be more dominant in the face of the avatar or virtual character.

2. The method of claim 1, wherein the first mesh model is generated based on a result of analysis generated by analyzing a location relation of the detected landmark with respect to multiple basic face mesh models previously stored in a database.

3. The method of claim 2, further comprising applying, to the first mesh model, a blend shape for adjusting a size of a specific portion within the face in response to a user input.

4. The method of claim 3, further comprising:
   detecting, in a moving image, a modification of a specific portion within the face when the 2D image is the moving image comprising continuous images, and
   applying a corresponding modification to the first mesh model or the 3D avatar based on a predetermined rule of the blend shape.

5. The method of claim 4, wherein the predetermined rule of the blend shape is defined with respect to a mean face mesh model of the multiple basic face mesh models previously stored in the database.

6. The method of claim 4, wherein the predetermined rule of the blend shape is defined as a number corresponding to a specific movement or state.

7. The method of claim 2,
   wherein the second mesh model has a mesh topology identical with a mean mesh topology of the multiple basic face mesh models previously stored in the database, and
   wherein the second mesh model is at least one of a model having highlighted beauty or an animation character model, and
   wherein the second mesh model is determined by displaying a plurality of second mesh model candidates and selecting one of the displayed plurality of second mesh model candidates through the user input.

8. The method of claim 2, wherein the database comprises a database associated with principal component analysis (PCA).

9. The method of claim 1, further comprising:
   detecting, in the 2D image, face attribute information indicative of a detailed feature of the face using a deep learning model; and
   applying, to the 3D avatar, the visual expression corresponding to the detected face attribute information.

10. The method of claim 9, wherein the face attribute information comprises an attribute related to at least one of hair, glasses, mustache and/or beard, eyebrows, eyes, a mouth, a nose, skin, an expression, and a jaw of the face.

11. An apparatus for generating a three-dimensional (3D) avatar from a two-dimensional (2D) image, the apparatus comprising:
    a processor; and
    a memory storing an instruction related to an operation of the processor,
    wherein the processor is configured to
        obtain a 2D image related to a face of a person,
        detect a landmark of the face in the obtained 2D image,
        generate a first mesh model by modeling a 3D geometrical structure of the face based on the detected landmark,
        extract face texture information from the obtained 2D image or modify at least one face element in the first mesh model,
        determine a second mesh model to be blended with the first mesh model in response to a user input or wherein the modified first mesh model and the second mesh model have and identical mesh topology, the first mesh model and the second mesh model having an identical mesh topology,
        generate a 3D avatar by blending the first mesh model and the second mesh model or by blending the modified first mesh model and the second mesh model, and
        apply, to the 3D avatar, a visual expression corresponding to the extracted face texture information,
    wherein the second mesh model indicates a plurality of second mesh model candidates and is determined based on a user selection of one of the plurality of indicated second mesh model candidates,
    wherein the processor is further configured to generate the first mesh model based on a result of analysis generated by analyzing a location relation of the detected landmark with respect to multiple basic face mesh models previously stored in a database, wherein the processor is further configured to apply, to the first mesh model, a blend shape for adjusting a size of a specific portion within the face in response to inputs from the user, and wherein the blending is performed at a particular blending ratio of x:y that is based upon a user preference, wherein 'x' represents a blending amount of the first mesh model and 'y' represents a blending amount of the second mesh model, whereby x>y results in characteristics of the first mesh model to be more dominant in the face of the avatar or virtual character, and x<y results in characteristics of the second mesh model to be more dominant in the face of the avatar or virtual character.

12. The apparatus of claim 11, wherein the processor is further configured to detect, in the 2D image, face attribute information indicative of a detailed feature of the face using a deep learning model, and to apply, to the 3D avatar, a visual expression corresponding to the detected face attribute information.

13. The apparatus of claim 12, wherein the memory and the processor are implemented in a server that is capable of cooperating with a user terminal, which has a display to show the second mesh model candidates, can receive the user input for selection of one or more of the second mesh model candidates and has a camera that is capable of obtaining the 2D image.

14. A computer-implemented method comprising:

extracting landmark features from at least one face in an image, wherein the landmark features, as defined by an extraction algorithm, are comprised of multiple graphical image points or coordinates that characterize the face;

generating a first mesh model for the face, using a mesh topology obtained from basic face models stored in a database or storage means, wherein the mesh topology defines an array of geometrical structures between essential elements constituting the face; and creating a face of an avatar or virtual character by performing graphics blending of the first mesh model with a second mesh model selected or obtained, based on user input, from among multiple second mesh model candidates, which have similar or same mesh topology characteristics as those of the first mesh model and stored in the database or storage, wherein the first mesh model is generated based on a result of analysis generated by analyzing a location relation of the detected landmark with respect to multiple basic face mesh models previously stored in a database, wherein the first mesh model is applied to a blend shape for adjusting a size of a specific portion within the face in response to inputs from the user, and wherein the graphics blending is performed at a particular blending ratio of x:y that is based upon a user preference, wherein 'x' represents a blending amount of the first mesh model and 'y' represents a blending amount of the second mesh model, whereby x>y results in characteristics of the first mesh model to be more dominant in the face of the avatar or virtual character, and x<y results in characteristics of the second mesh model to be more dominant in the face of the avatar or virtual character.

15. The method of claim 14, further comprising: adding, to the face of the avatar or virtual character, at least one among face texture information and face attribute information obtained from the image, resulting in additional details in the face of the avatar or virtual character.

16. The method of claim 15, further comprising: applying motions or animation effects to facial features or related aspects of the face of the avatar or virtual character based on blend shape information related to the basic face models stored in the database or storage.

17. The method of claim 16, wherein at least one among the extracting step, the generating step, the creating step, the adding step and the applying step is performed in a server, which is capable of communication with a user terminal that has a camera capable of capturing the image and has a storage capable of storing the image.

18. The method of claim 16, wherein at least one among the extracting step, the generating step, the creating step, the adding step and the applying step is performed in a user terminal that is capable of communication with a server, wherein the user terminal has a camera capable of capturing the image and has a storage capable of storing the image.

* * * * *